US010394832B2

(12) United States Patent
Bendersky et al.

(10) Patent No.: US 10,394,832 B2
(45) Date of Patent: Aug. 27, 2019

(54) RANKING SEARCH RESULTS DOCUMENTS

(71) Applicant: Google Inc., Mountain View, CA (US)

(72) Inventors: Mike Bendersky, Sunnyvale, CA (US);
Marc Alexander Najork, Palo Alto, CA (US); Donald Metzler, Los Angeles, CA (US); Xuanhui Wang, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 367 days.

(21) Appl. No.: 15/332,839

(22) Filed: Oct. 24, 2016

(65) Prior Publication Data

US 2018/0113866 A1 Apr. 26, 2018

(51) Int. Cl.
G06F 16/25 (2019.01)
G06F 16/248 (2019.01)
G06F 16/335 (2019.01)
G06F 16/2457 (2019.01)

(52) U.S. Cl.
CPC ...... *G06F 16/24578* (2019.01); *G06F 16/248* (2019.01); *G06F 16/252* (2019.01); *G06F 16/337* (2019.01)

(58) Field of Classification Search
None
See application file for complete search history.

(56) References Cited

U.S. PATENT DOCUMENTS

2007/0150470 A1* 6/2007 Brave ............... G06F 17/30867
2017/0093771 A1* 3/2017 Gatti ........................ H04L 51/12

FOREIGN PATENT DOCUMENTS

AU 2008261113 A1 1/2009
WO 2007124430 A2 1/2007

OTHER PUBLICATIONS

Resnick, Internet Message Format Apr. 1, IETF, RFC 2822, https://www.ietf.org/rfc/rfc2822.txt.*
International Search Report and Written Opinion of PCT Ser. No. PCT/US2017/052725 dated Jan. 23, 2018.
United Kingdom Intellectual Property Office; Examination Report issued in Application No. 17156021 dated Mar. 14, 2018.
(Continued)

*Primary Examiner* — Jason G Liao
(74) *Attorney, Agent, or Firm* — Middleton Reutlinger

(57) ABSTRACT

Methods and apparatus related to using document feature(s) of a document that is responsive to a query, and optionally query feature(s) of the query, to determine a presentation characteristic for presenting a search result that corresponds to the document. In some implementations, measures associated with the document feature(s) and/or query feature(s) may be used to determine the presentation characteristic. The measures may be based on past interactions, by corresponding users, with other documents that share one or more of the document features with the document, where a plurality of the other documents are different from the document (and optionally each different from one another). In some implementations, the document and/or the other documents include, or are restricted to, documents that are access restricted.

17 Claims, 7 Drawing Sheets

(56) References Cited

OTHER PUBLICATIONS

Agichtein et al., "Improving Web Search Ranking by Incorporating User Behavior Information." In Proceedings of the 29th annual international ACM SIGIR Conference on Research and Development in Information Retrieval, pp. 19-26. ACM, 2006. 2006.

Ailon et al., "Threading Machine Generated Email." In Proceedings of the Sixth ACM International Conference on Web Search and Data Mining, pp. 405-414. ACM, 2013 2013.

Anguera et al . . . "Multimodal Photo Annotation and Retrieval on a Mobile Phone." In Proceedings of the 1st ACM International Conference on Multimedia Information Retrieval, pp. 188-194. ACM, 2008 2008.

Bekkerman, Ron. "Automatic Categorization of Email Into Folders: Benchmark Experiments on Enron and SRI Corpora." 24 pages 2004.

Bendersky et al. "Priors in Web Search." In SIGIR 2009 Workshop on Learning to Rank for Information Retrieval (LR4IR). 8 pages. 2009 2009.

Bendersky et al. "Quality-Biased Ranking of Web Documents." In Proceedings of the Fourth ACM International Conference on Web Search and Data Mining, pp. 95-104. ACM, 2011 2011.

Bickel et al. "Multi-View Clustering." In ICDM, vol. 4, pp. 19-26. 2004 2004.

Brin et al . . . "The Anatomy of a Large-Scale Hypertextual Web Search Engine." In 7th International Conference on World Wide Web (WWW), pp. 107-117, 1998 1998.

Broder, Andrei. "A Taxonomy of Web Search." In ACM SIGIR Forum, vol. 36, No. 2, pp. 3-10. ACM, 2002 2002.

Carmel et al. "Rank by time or by relevance?: Revisiting email search." In Proceedings of the 24th ACM International on Conference on Information and Knowledge Management, pp. 283-292. ACM, 2015 2015.

Cheng et al. "Wide & Deep Learning for Recommender Systems." In Proceedings of the 1st Workshop on Deep Learning for Recommender Systems, pp. 7-10. ACM, 2016 2016.

Craswell et al. "Random Walks on the Click Graph." In Proceedings of the 30th annual International ACM SIGIR Conference on Research and Development in Information Retrieval, pp. 239-246. ACM, 2007 2007.

Craswell et al. "An Experimental Comparison of Click Position-Bias Models." In Proceedings of the 2008 International Conference on Web Search and Data Mining, pp. 87-94. ACM, 2008 2008.

Dumais et al. "Stuff I've Seen: A System for Personal Information Retrieval and Re-Use." In ACM SIGIR Forum, vol. 49, No. 2, pp. 28-35. ACM, 2016 2016.

Gao et al . . . "Clickthrough-Based Latent Semantic Models for Web Search." In Proceedings of the 34th International ACM SIGIR Conference on Research and Development in Information Retrieval, pp. 675-684. ACM, 2011 2011.

Grbovic et al. "How many folders do you really need? Classifying email into a handful of categories." In Proceedings of the 23rd ACM International Conference on Conference on Information and Knowledge Management (pp. 869-878). ACM, Nov. 2014 2014.

Guo et al. "Beyond dwell time: estimating document relevance from cursor movements and other post-click searcher behavior." In Proceedings of the 21st International Conference on World Wide Web (pp. 569-578). ACM, 2012, Apr. 2012.

Guo et al. "Mining Touch Interaction Data on Mobile Devices to Predict Web Search Result Relevance." In Proceedings of the 36th International ACM SIGIR Conference on Research and Development in Information Retrieval (pp. 153-162). ACM, 2013, Jul. 2013.

Agarwal, S. Official Gmail Blog: A bit about Bundles in Inbox. https://gmail.googleblog.com/2014/11/a-bit-about-bundles-in-inbox.html, 2014 2014.

Huang et al. "Learning Deep Structured Semantic Models for Web Search Using Clickthrough Data" In Proceedings of the 22nd ACM International Conference on Conference on Information & Knowledge Management (pp. 2333-2338). ACM, 2013, Oct. 2013.

Joachims, Thorsten. "Optimizing Search Engines Using Clickthrough Data." In Proceedings of the eighth ACM SIGKDD international Conference on Knowledge Discovery and Data Mining, pp. 133-142. ACM, 2002 2002.

Joachims et al. "Accurately Interpreting Clickthrough Data As Implicit Feedback." In Proceedings of the 28th Annual International ACM SIGIR Conference on Research and Development in Information Retrieval, pp. 154-161. ACM, 2005 2005.

Kamvar et al. "Computers and Iphones and Mobile Phones, Oh My!: A Logs-Based Comparison of Search Users on Different Devices." In Proceedings of the 18th International Conference on World Wide Web, pp. 801-810. ACM, 2009 2009.

Liu, Tie-Yan. "Learning to Rank for Information Retrieval." Foundations and Trends in Information Retrieval 3, No. 3 (2009): 225-331 2009.

Richardson et al. "Predicting Clicks: Estimating the Click-Through Rate for New Ads." In Proceedings of the 16th International Conference on World Wide Web, pp. 521-530. ACM, 2007 2007.

Richardson et al. "Beyond PageRank: Machine Learning for Static Ranking." In Proceedings of the 15th International Conference on World Wide Web, pp. 707-715. ACM, 2006 2006.

Wang et al. "Learning to Rank With Selection Bias in Personal Search." In Proceedings of the 39th International ACM SIGIR conference on Research and Development in Information Retrieval, pp. 115-124. ACM, 2016 2016.

Wendt et al. "Hierarchical Label Propagation and Discovery for Machine Generated Email." In Proceedings of the Ninth ACM International Conference on Web Search and Data Mining (pp. 317-326). ACM, 2016, Feb. 2016.

White et al. "Studying the Use of Popular Destinations to Enhance Web Search Interaction." In Proceedings of the 30th Annual International ACM SIGIR Conference on Research and Development in Information Retrieval, pp. 159-166. ACM, 2007 2007.

European Patent Office; Written Opinion of the International Preliminary Examining Authority of PCT Ser. No. PCT/US2017/052725; 6 pages; dated Oct. 9, 2018.

European Patent Office; International Preliminary Report on Patentability of PCT Ser. No. PCT/US2017/052725; 11 pages; dated Dec. 17, 2018.

\* cited by examiner

RANKING SEARCH RESULTS DOCUMENTS

BACKGROUND

Search engines provide information about various documents such as web pages, images, text documents, multimedia content, and/or electronic communications. For example, in response to receiving a search query, a search engine identifies one or more documents that are responsive to the query. The search engine ranks the documents based on the relevance of the documents to the query and/or based on other ranking signal(s), and provides corresponding search results in response to the search query. The search results may include aspects of and/or links to the documents and may be provided based on the rankings.

SUMMARY

This specification is directed to technical features related to using document feature(s) of a given document that is responsive to a query, and optionally query feature(s) of the query, to determine a presentation characteristic for presenting a search result that corresponds to the given document— and, in response to the query, providing the search result for presentation with the presentation characteristic. In some implementations, the given document that is responsive to the query may be an access restricted document, such as an access restricted document that is accessible to only a user that submitted the query and optionally to other users designated by that user.

In some implementations, measures associated with the document feature(s) and/or query feature(s) may be used to determine the presentation characteristic. The measures may be based on past interactions, by corresponding users, with other documents that share one or more of the document features with the given document, where a plurality of the other documents are each different from the given document (and optionally each different from one another). Using such measures enables the past interactions with other documents to be leveraged in determining interaction-based relevance of the given document, optionally without reference to any query based past interactions that are specifically directed to the given document. In some implementations, the other documents include, or are restricted to, documents that are themselves access restricted.

In some implementations, in determining a presentation characteristic of a search result that corresponds to a given document that is responsive to a query, a query dependent measure for the given document is generated and used to determine the presentation characteristic. In some of those implementations, the query dependent measure is used to determine a score for the given document and that score is used to rank the given document relative to other responsive documents for the query (e.g., based on their corresponding scores, which may also be based on corresponding query dependent measures). For example, the query dependent measure may be utilized to modify an initial score for the given document (e.g., a score based on a degree of matching between the query and the given document), and the modified score utilized to rank the given document relative to other responsive documents for the query. The ranking may be utilized, for example, to determine which responsive documents are initially utilized in providing corresponding search results for presentation in response to the query and/or to determine a presentation order (or other display prominence) for the search results.

In some implementations, the query dependent measure for a given document that is responsive to a query is determined based on measures of past interactions between query features of the query and document features of the given document. Each of the measures may be based on a quantity of the past interactions, by corresponding users, with other documents having one or more of the document features when the other documents were presented in response to corresponding queries having one or more of the query features. Various past interactions may be utilized to determine the measures such as selections of search results corresponding to the other documents in response to the corresponding queries (e.g., a clicked to observed fraction), document access counts, cursor tracking, and/or touch gestures. In some implementations, the other documents themselves may include, or be restricted to, a plurality of access restricted documents, such as non-accessible documents that are each personal to a corresponding one of the other users and that are not accessible to the user.

In some implementations, a query independent measure for the given document is generated and additionally or alternatively used to determine the presentation characteristic. In some of those implementations, the query independent measure is based on measures of past interactions, by corresponding users, with other documents having one or more of the document features of the given document, when the other documents were presented in response to corresponding queries that include queries that do not include any of the query features. Accordingly, the query independent measure may provide an indication of the overall popularity of documents having the document feature(s), whereas the query dependent measure provides an indication of the popularity of documents having the document feature(s) in response to queries having the query features.

In some implementations, a method is provided that includes receiving a query that is entered by a user via a user interface input device of a computing device of the user. The method further includes identifying responsive documents that are responsive to the query, including an email sent to an email address of the user. The method further includes identifying one or more document features for the email. The document features include at least one email feature that is based on at least one of: From content, based on its presence in a From field of the email, and Subject content, based on its presence in a Subject field of the email. The method further includes identifying one or more query features for the query and generating a query dependent measure for the email based on measures of past interactions between the query features and the document features, where each of a plurality of the measures is based on a quantity of the past interactions, by corresponding users, with other documents having one or more of the document features when the other documents were presented in response to corresponding queries having one or more of the query features. The method further includes: using the query dependent measure for the email to determine a presentation characteristic for presenting an email search result that corresponds to the email; and providing, in response to the query, the email search result for presentation with the presentation characteristic.

This method and other implementations of technology disclosed herein may each optionally include one or more of the following features.

In some implementations, the at least one email feature is based on both the From content in the From field and the Subject content in the Subject field. In some of those implementations, the at least one email feature is co-occurrence of the From content in the From field and the Subject content in the Subject field. The From content may include a domain name of a sender email address of the email and/or the Subject content may include a template that includes one or more terms and one or more placeholders.

In some implementations, the at least one email feature is based on the Subject content in the Subject field and the Subject content includes a template that includes one or more terms and one or more placeholders.

In some implementations, the other documents on which the measures are based exclude the email.

In some implementations, the method further includes: generating a query independent measure for the email based on additional measures of additional past interactions with the document features in response to additional queries not having any of the query features; and further using the query independent measure for the email to determine the presentation characteristic for presenting the email search result that corresponds to the email.

In some implementations, using the query dependent measure for the email to determine the presentation characteristic comprises: determining a score for the email based on the query dependent measure; determining additional scores for other of the responsive documents; ranking the email relative to the other of the responsive documents based on the score and the additional scores; and determining the presentation characteristic based on the ranking.

In some implementations, the document features further include a category of the email. In some of those implementations, the method further includes using a machine learning model to determine the category of the email.

In some implementations, the past interactions with other documents having one or more of the document features includes selections of the other documents.

In some implementations, a method is provided that includes receiving a query entered by a user via a user interface input device of a computing device of the user, and identifying responsive documents that are responsive to the query. The responsive documents include access restricted documents of the user. The access restricted documents are user accessible to only the user and any restricted group of other users designated by the user. The method further includes identifying one or more query features for the query and, for each of a plurality of the access restricted documents: identifying one or more document features for the access restricted document; and generating a query dependent measure for the access restricted document based on measures of past interactions between the query features and the document features, where each of the measures is based on a quantity of the past interactions, by corresponding users, with other documents having one or more of the document features when the other documents were presented in response to corresponding queries having one or more of the query features, and where the other documents may optionally include a plurality of non-accessible documents that are not accessible to the user. The method further includes using the query dependent measures for the access restricted documents to determine a presentation order for the responsive documents and providing, in response to the query, one or more of the responsive documents for presentation based on the presentation order.

This method and other implementations of technology disclosed herein may each optionally include one or more of the following features.

In some implementations, the document features for the access restricted document comprise a template that is included in a particular field of the access restricted document.

In some implementations, the other documents exclude one or more of the access restricted documents.

In some implementations, the other documents on which a given measure of the measures is based consists of non-accessible documents that are not accessible to the user.

In some implementations, the method further includes: for each of the access restricted documents, generating a query independent measure for the access restricted document based on additional measures of additional past interactions with the document features in response to additional queries not having any of the query features; and further using the query independent measures for the access restricted documents to determine the presentation order for the responsive documents.

In some implementations, a method is provided that includes receiving a query entered by a user via a user interface input device of a computing device of the user, identifying responsive documents that are responsive to the query, and identifying one or more query features for the query. The method further includes, for each of a plurality of the documents: identifying one or more document features for the document and generating a query dependent measure for the document based on measures of past interactions between the query features and the document features, where each of the measures is based on a quantity of the past interactions, by corresponding users, with other documents having one or more of the document features when the other documents were presented in response to corresponding queries having one or more of the query features, and where the other documents include a plurality of documents that are in addition to the document. The method further includes using the query dependent measures for the documents to determine a presentation order for the responsive documents and providing, in response to the query, one or more of the responsive documents for presentation based on the presentation order.

In some implementations, a method is provided that includes: selecting a plurality of document features and selecting a plurality of query features. Selecting each of the document features includes selecting the document feature based on its occurrence in access restricted documents of at least a threshold quantity of users. Selecting each of the query features includes selecting the query feature based on its occurrence in access restricted queries of at least a threshold quantity of users. The access restricted queries are those for which at least one of the access restricted documents was provided in response. The method further includes, for each of a plurality of query feature, document feature tuples that each include at least one of the query features and at least one of the document features: generating a past interaction measure between the query features and the document features of the query feature, document feature tuple. Generating the past interaction measure is based on a quantity of past interactions with corresponding documents of the access restricted documents when the corresponding documents were presented in response to corresponding queries of the access restricted queries, where the corresponding documents have the document features of the query feature, document feature tuple, and where the corresponding queries have the query feature of the query feature, document feature tuple. The method further includes storing, in one or more computer readable media, each of the past interaction measures in association with a corresponding query feature, document feature tuple.

This method and other implementations of technology disclosed herein may each optionally include one or more of the following features.

In some implementations, the method further includes: identifying a new document that is responsive to a new query of a given user and that includes a new query group of the document features; and generating a measure for the new document based on a group of the past interaction measures. The group of the past interaction measures may be selected based on the past interaction measures of the group being stored in association with query feature, document feature tuples that each include at least one of the document features of the new query group. The method further includes providing the new document in response to the new query based on the measure. In some of those implementations, the group of the past interaction measures is further selected based on the past interaction measures of the group being stored in association with query feature, document feature tuples that each include at least one query feature of the new query. In some implementations, the new document is omitted from the access restricted documents used in generating the past interaction measures.

In some implementations, a method is provided that includes selecting a plurality of document features and selecting a plurality of query features. The method further includes, for each of a plurality of query feature, document feature tuples that each include at least one of the query features and at least one of the document features: generating a past interaction measure between the query features and the document features of the query feature, document feature tuple, where: generating the past interaction measure is based on a quantity of past interactions with corresponding documents when the corresponding documents were presented in response to corresponding queries; the corresponding documents have the document features of the query feature, document feature tuple; and the corresponding queries have the query feature of the query feature, document feature tuple. The method further includes storing, in one or more computer readable media, each of the past interaction measures in association with a corresponding query feature, document feature tuple.

Other implementations may include one or more non-transitory computer readable storage media storing instructions executable by one or more processors to perform a method such as one or more of the methods described herein. Yet another implementation may include a system including memory and one or more processors operable to execute instructions, stored in the memory, to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
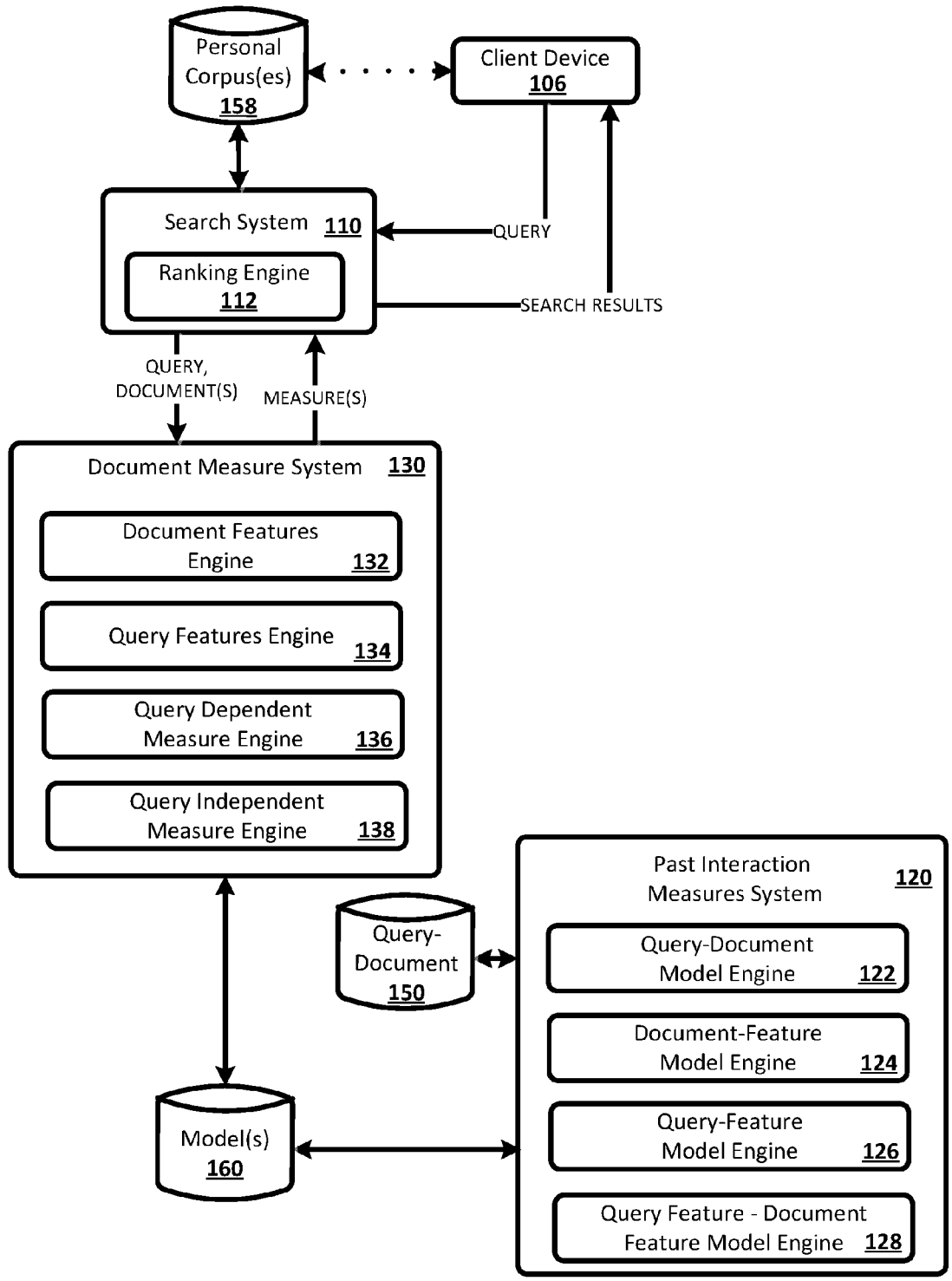
FIG. 1 is a block diagram of an example environment in which some implementations disclosed herein may be implemented.

Some implementations disclosed herein may be applicable to access restricted documents. As used herein, an "access restricted document" is contrasted with a publicly accessible document (e.g., freely accessible to the public via the World Wide Web) and is an electronic document that is accessible to a restricted group of users. In some implementations, access to an access restricted document may be restricted to the restricted group of users based on login credentials of the restricted group of users, based on the access restricted document being accessible via a private network that is accessible to only the restricted group of users, and/or based on other techniques. As used herein, an "access restricted document of a user" is an access restricted document that is accessible to only the user and optionally to a restricted group of one or more other users that can be designated or otherwise controlled by the user. For example, an access restricted document of a user may be accessible to only the user as a function of: being stored locally on a computing device controlled by the user, being accessible via one or more computer applications via appropriate login credentials of the user, etc. For instance, emails of the user may be access restricted documents of the user that are accessible to only the user via appropriate login credentials of the user. Also, for instance, heterogeneous documents of a user stored in a cloud-based storage system may be access restricted documents of the user that are accessible to only the user via appropriate login credentials of the user. Optionally, one or more of the heterogeneous documents may also be accessible to a restricted group of other users based on an explicit authorization by the user via one or more computer applications. Also, for instance, various documents stored locally on a mobile phone, tablet, desktop, and/or other computing device(s) of a user may be access restricted documents of the user as a result of being stored locally on the computing device(s) of the user.

User interaction data (e.g., click-through rate) has been used to rank particular publicly accessible search result documents for particular queries. For example, user interaction data may indicate that for a particular search query, a particular publicly accessible search result document that is responsive to the particular search query has a click-through rate, for that particular search query, that far exceeds that of any other publicly accessible search result documents that are responsive to the particular search query. Based on such an indication, a search result corresponding to the particular publicly accessible search result document may be ranked more prominently (e.g., provided for presentation more prominently), for the particular search query, than search results for the other responsive publicly accessible search result documents.

However, various techniques related to using user interaction data to rank publicly accessible search results for particular queries may not be applicable to various documents and/or may not provide desired performance. For example, various techniques may not be applicable to various access restricted documents (e.g., access restricted documents of a user submitting a query) and/or to various publicly accessible documents (e.g., publicly accessible documents that have no and/or relatively few interactions in response to queries).

As one example, assume a user submits a search query to search the user's personal email and that a plurality of responsive emails (that are access restricted documents of the user) are identified as responsive to the search query (e.g., the emails include one or more terms that match one or more terms of the search query). It may be the case that one or more (e.g., all) of the responsive emails may have never been presented and/or interacted with in response to prior searches of other users and/or of the user. For example, a particular email may be an email that was sent only to the user and with which the user has never previously interacted in response to a prior search query. Accordingly, there may not be any user interaction data associated with the particular email, rendering various techniques, related to using user interaction data to rank publicly accessible search results, ineffective to ranking the particular email.

As another example, assume a user submits a search query to search a corpus of access restricted documents that are accessible to a restricted group of users, and that a plurality of responsive documents are identified as responsive to the search query. It may be the case that one or more (e.g., all) of the responsive documents may have never been presented and/or interacted with in response to prior submissions of the search query and/or may have been presented and/or interacted with only a de minimis amount in response to prior submissions of the search query. Accordingly, there may not be sufficient user interaction data associated with such documents in response to the search query, rendering various techniques, related to using user interaction data to rank publicly accessible search results, ineffective to ranking such documents.

As yet another example, assume a user submits a search query to search a corpus of publicly accessible documents, and that a plurality of responsive documents are identified as responsive to the search query. It may be the case that one or more (e.g., all) of the responsive documents may have never been presented and/or interacted with in response to prior submissions of the search query and/or may have been presented and/or interacted with only a de minimis amount in response to prior submissions of the search query. Accordingly, there may not be sufficient user interaction data associated with such documents in response to the search query, rendering various techniques, related to using user interaction data to rank publicly accessible search results, ineffective to ranking such documents.

This specification presents various technical features related to using document feature(s) of a document that is responsive to a query, and optionally query feature(s) of the query, to determine a presentation characteristic for presenting a search result that corresponds to the document—and, in response to the query, providing the search result for presentation with the presentation characteristic. Measures associated with the document feature(s) and/or query feature(s) may be used to determine the presentation characteristic. The measures may be based on past interactions, by corresponding users, with other documents that share one or more of the document features with the document, where a plurality of the other documents are each different from the document (and optionally each different from one another). Using such measures enables the past interactions to be leveraged in determining interaction-based relevance of the access restricted document, optionally without reference to any past interactions that are specifically directed to the access restricted document. In some implementations, the other documents include, or are restricted to, documents that are themselves access restricted.

In some implementations, in determining a presentation characteristic of a search result that corresponds to a document that is responsive to a query, a query dependent measure for the access restricted document is generated and used to determine the presentation characteristic. In some of those implementations, the query dependent measure is based on measures of past interactions between query features of the query and document features of the document. Each of the measures may be based on a quantity of the past interactions, by corresponding users, with other documents having one or more of the document features when the other documents were presented in response to corresponding queries having one or more of the query features.

As one example, assume a user utilizes an email search interface to submit a query of "book order number". A corpus of the user's emails that are each access restricted documents of the user may be searched and a plurality of responsive emails identified as responsive to the query. A particular responsive email may be from "store@exampleurl.com", may include a subject of "Confirmation of Order 1A2B3C", and may include a body with content that identifies a particular book purchased by the user, along with details of the purchase (e.g., date of purchase, shipping address, delivery date, cost). The particular responsive email may have never been interacted with by other users in response to queries of the other users (i.e., since it is personal to the user and not accessible to the other users)—and may have potentially never even been interacted with by the user in response to a query of the user. However, techniques described herein may still be utilized to determine a query dependent measure for the particular email based on measures of past interactions between query features of the query "book order number" and document features of the particular email.

For example, a first measure of past interactions may be determined based on a quantity of interactions of multiple users with other emails that include "store@exampleurl.com" in a From field and "Confirmation of Order [#]" (where [#] is a placeholder indicating an alpha and/or numeric string) in a Subject field, when those other emails were presented in response to corresponding queries having n-grams of "book order". Also, for example, a second measure of interactions may be determined based on a quantity of interactions of multiple users with other emails that include "store@exampleurl.com" in a From field and "Confirmation of Order [#]" in a Subject field, when those other emails were presented in response to corresponding queries having n-grams of "order number". The query dependent measure may be generated based on the first measure, the second measure, and optionally other similarly determined measures. For example, the query dependent measure may be a sum, average, median, or other statistical combination of the measures.

The query dependent measure may be used to determine a presentation characteristic for the particular responsive email. For example, the query dependent measure may be utilized to modify an initial score for the particular responsive email (e.g., a score based on a degree of matching between the query and the particular email), and the score utilized to rank the particular email relative to other responsive emails (e.g., based on optionally modified initial scores for those emails). The ranking may be utilized, for example, to determine which responsive emails are initially utilized in providing corresponding search results for presentation in response to the query, to determine a presentation order (or other display prominence) for the search results, and/or to determine additional or alternative presentation characteristics for search results.

In some implementations, a query independent measure for the document is generated and additionally or alternatively used to determine the presentation characteristic. In some of those implementations, the query independent measure is based on measures of past interactions, by corresponding users, with other documents having one or more of the document features of the document when the other documents were presented in response to corresponding queries, where those queries include, or are restricted to, those that do not include any of the query features. Accordingly, the query independent measure may provide an indication of the overall popularity of documents having the document feature(s), whereas the query dependent measure provides an indication of the popularity of documents having the document feature(s) in response to queries having the query features.

In some implementations, a query dependent measure and/or a query independent measure of a document may be generated based on a query feature—document feature model. The query feature—document feature model may be generated based on a query-document model, a document-feature model, and/or a query-feature model.

The query-document model may be, for example, a bipartite graph that models the interactions between queries and documents, as indicated by one or more stored records of past queries and corresponding interactions. For example, the nodes of the query-document graph may indicate queries and documents. The edges may be between query and document nodes and may each represent, for example, whether the corresponding document was observed for the corresponding query (e.g., a corresponding search result presented in response to the corresponding query) and/or whether the document was interacted with (e.g., selection of a corresponding search result) for the corresponding query.

The document-feature model may be, for example, a bipartite graph that models the relationship between documents and their document features. Various features may be utilized, such as category features, structural features, and/or n-gram features. For example, category features of a document may indicate one or more categories to which the document belongs and may be based on, for example, applying features of the document to a classifier or other machine learning model and determining the category features based on output generated over the machine learning model. As one example of categories, emails may belong to finance, travel, order confirmation, and/or other categories. Structural features may indicate templates and/or other contents of particular structural fields of documents. For example, for emails or other electronic communications, structural features may include: From content included in a From field of the electronic communication (e.g., a domain name of a sender's email address, a relationship of the sender to the user), Subject content included in a Subject field of the electronic communication (e.g., a particular template to which the Subject field conforms such as "Confirmation of Order [#]"), and/or a co-occurrence of particular From content and particular Subject content (i.e., the From Content and the Subject Content both occurring in their respective fields). Also, for example, structural features of an access restricted document may include a file type feature that is based on, for example, a file extension of the access restricted document. Other structural features may include content, such as template(s) and/or n-grams that appear in one or more particular additional and/or alternative fields of a document, such is in a title field of a document; in a title, location, and/or notes field of a calendar entry document; etc.

The query-feature model may be, for example, a bipartite graph that models the relationship between queries and their query features. The query features of a query may include, for example, one or more n-grams appearing in the query (e.g., the longest n-gram appearing in the query), one or more entities referenced in the query (e.g., a particular person, place, and/or thing), one or more entity categories referenced in the query (e.g., city, person's name, location, restaurant), grammatical features of the query, etc.

The query feature—document feature model may be, for example, a bipartite graph that is generated using the query-document graph, the document-feature graph, and the query-feature graph. The query feature—document feature model models the interactions between document features and query features. In other words, it models interactions between document and query features, instead of interactions directly between queries and documents. In some implementations, it is generated based on transforming the query-document model to the "document features" and "query features" space collectively modeled by the document-feature and query-feature models.

In many implementations, only features (query or document) that are present in at least a threshold number of times (in queries or documents) and/or for at least a threshold number of users may be utilized in generating the query-feature, document-feature, and/or the query feature—document feature graphs. In some of those implementations, this may ensure features do not include sensitive information by ensuring those features occur at least a threshold number of times and/or for at least a threshold number of users.

The query feature—document feature model may be utilized to determine, for a given document, a query independent measure and/or query dependent measure for the given document. For example, to determine a query dependent measure for a given query having given query feature(s), edges between the given query feature(s) and document features of the given document may be determined. Each of the edges provides a measure of past interactions between a corresponding query feature and a corresponding document feature. The measures may be combined (e.g., summed and/or other statistical combination) to determine the query dependent measure. Also, for example, to determine a query independent measure for the given document, edges between all query features and document features of the document may be determined. The measures may be combined (e.g., summed and/or other statistical combination) to determine the query independent measure.

Referring now to FIG. 1, an example environment in which techniques disclosed herein may be implemented is illustrated. The example environment includes a client device 106, a search system 110, a past interaction measures system 120, and a document measure system 130. The example environment further includes personal corpus(es) 158 of a user of the client device 106. The personal corpus(es) 158 may each be stored on one or more corresponding non-transitory computer readable media, which may be on the client device 106 and/or remote from the client device 106 (e.g., on one or more remote servers). The personal corpus(es) 158 may each store one or more access restricted documents of the user such as electronic communications of the user (e.g., emails, SMS messages, chat messages, social networking messages), media files (e.g., audio files, image files, video files), word processing documents, calendar entries, contact entries, etc.

The example environment further includes a query-document model 150 that may be stored on one or more non-transitory computer readable media. The query-document model 150 may be, for example, a bipartite graph that models the interactions between queries and documents (including, or restricted to, access restricted documents), as indicated by one or more stored records of past queries and corresponding interactions. For example, the query-document model 150 may be generated based on records of past queries and corresponding interactions provided by the search system 110 and/or other search systems based on interactions with the search system(s) by multiple users via multiple corresponding client devices. The example environment further includes one or more additional models 160 that may be generated by the past interaction measures system 120 and utilized by the document measure system 130. For example, the one or more additional models 160 may include at least a query feature—document feature model.

A user of the client device 106 can submit queries to the search system 110 via one or more user interface input devices of the client device 106. For example, the user may speak the query using a microphone of the client device 106, type the query using a hardware and/or virtual keyboard of the client device 106, etc. In response to a query from the client device 106, the search system 110 searches the personal corpus(es) 158 to identify access restricted document(s) of the user (if any) that are responsive to the search query using, for example, conventional and/or other information retrieval techniques. In some implementations, the personal corpus(es) 158 may include an index that indexes documents thereof based on one or more features, and the search system 110 identifies responsive documents using the index. In some implementations, the search system 110 additionally or alternatively searches corpus(es) that include, or are restricted to, access restricted document(s) that are not access restricted documents of the user and/or publicly accessible document(s).

The search system 110 includes a ranking engine 112 that calculates scores for the documents identified as responsive to a search query, for example, using one or more ranking signals. Each ranking signal provides information about the document itself and/or the relationship between the document and the search query.

In many implementations, the ranking signals on which the ranking engine 112 calculates scores for a given document include a query dependent measure and/or a query independent measure generated by the document measure system 130 according to implementations described herein. In some implementations, the ranking engine 112 may utilize additional ranking signals, such as ranking signals that indicate a degree of matching between the given document and the search query. For example, the ranking signals for a document may be based on whether each of one or more query terms appears in the document, where each of one or more query terms appear in the document, the term frequency of each of one or more of the query terms that appear in the document, and/or the document frequency of each of one or more of the query terms that appear in the document.

The ranking engine 112 then ranks the responsive documents using the scores. The search system 110 uses the responsive documents ranked by the ranking engine 112 to generate search results to provide in response to the query. The search results include search results corresponding to the documents responsive to the search query. For example, each of one or more search results can include a title of a respective of the documents, a link to a respective of the documents, and/or a summary of content from a respective of the documents. For example, the summary of content may include a particular "snippet" or section of the document that is responsive to the search query. Also, for example, for a search result associated with an image document, the search result may include a reduced size display of the image document, a title associated with the image document, and/or a link to the image document. Also, for example, for a search results associated with a video document, the search result may include an image from the video, a segment of the video, a title of the video, and/or a link to the video. Other examples of search results include a summary of information responsive to the search query. The summary can be generated from one or more documents responsive to the search query and/or from other sources.

Figure 6:
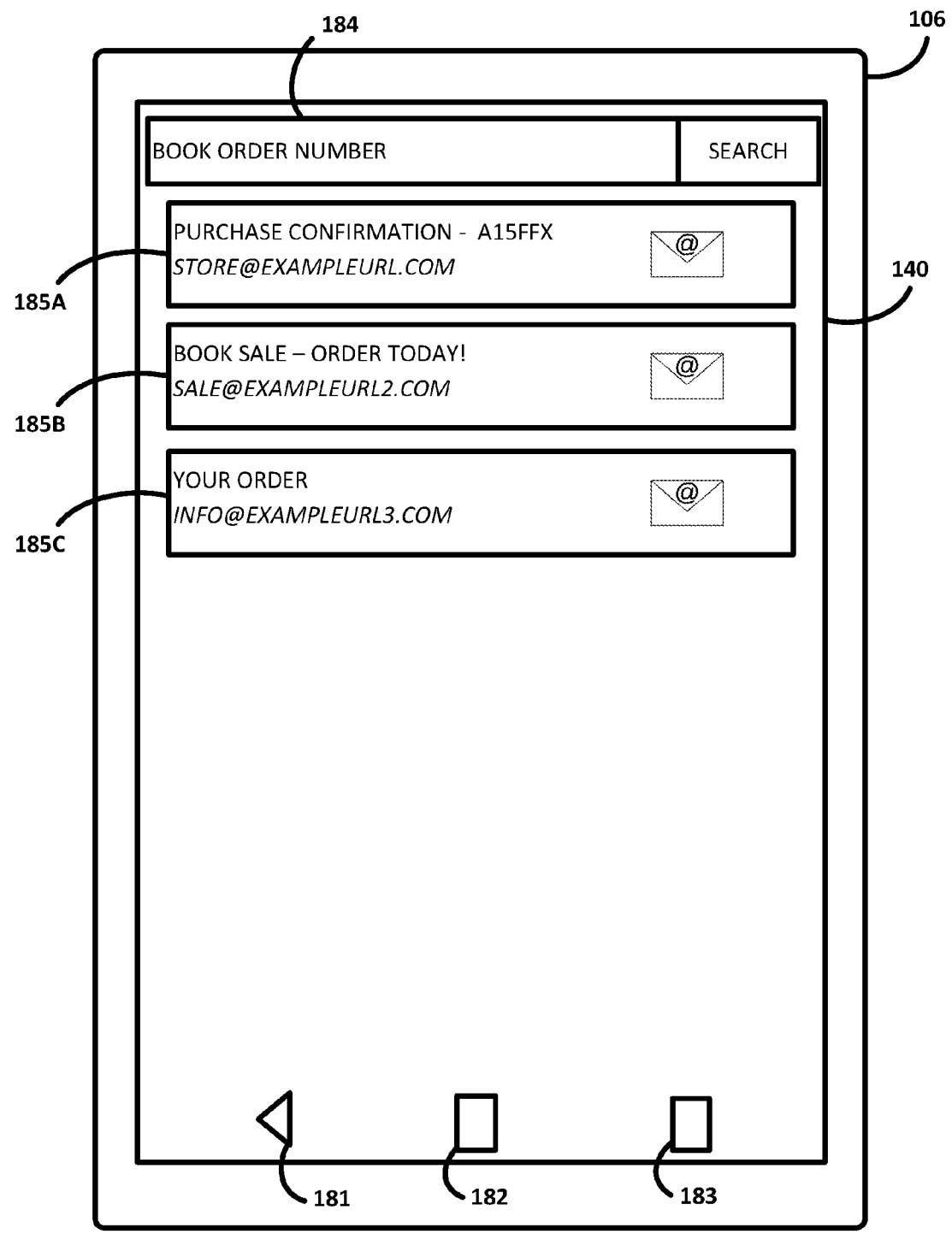
FIG. 6 illustrates an example client computing device with a display screen displaying access restricted search results with presentation characteristics determined according to implementations disclosed herein.

The search results are provided in a form that enables them to be presented to the user via one or more user interface output devices of the client device 106 (e.g., a display and/or a speaker). For example, the search results may be presented by the client device 106 in pop-up window(s) or other interface(s) rendered in an application executing on the client device 106 and/or as one or more search results conveyed to a user via audio. FIG. 6 presents one example of client device 106 displaying search results and is described in additional detail herein. The search results may be presented to the user with one or more presentation characteristics that are based on the ranking of the corresponding search result documents. For example, the most prominently displayed search result may be the highest ranked search result, the next most prominently displayed search result may be the second highest ranked search result, and so forth. Also, for example, only a subset of all of the search results may be initially presented and that subset may be selected based on the ranking.

The client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided. The client device 106 typically includes one or more applications to facilitate submission of search queries and the sending and receiving of data over a network.

Although depicted separately in FIG. 1, in some implementations the search system 110 may be implemented, in whole or in part, by the client device 106. For example, the personal corpus(es) 158 may include documents stored locally on the client device 106 and the search system 110 may search such locally stored documents. In some implementations, the search system 110 may be implemented, in whole or in part, by one or more remote computing devices and the client device 106 may communicate with the search system 110 through a network such as a local area network (LAN) or wide area network (WAN) (e.g., the Internet). Also, although FIG. 1 depicts the search system 110 interfacing with only client device 106 and only personal corpus(es) 158 that include access restricted documents of a user of the client device 106, in some implementations the search system 110 may interface with multiple client devices and/or access multiple corpuses, such as personal corpus(es) of multiple users and/or non-personal corpus(es). For example, search system 110 may be an email search system of an email service and may search a personal email corpus of a first user in response to queries of the first user, may search a personal email corpus of a second user in response to queries of the second user, etc.

Also, although only a single search system 110 is illustrated in FIG. 1, multiple search systems 110 may be provided and each may utilize query dependent and/or query independent measures provided by document measure system 130 (or a separate instance thereof). Also, although the search system 110 is illustrated as in communication with only personal corpus(es) 158, in some implementations the search system 110 may additionally or alternatively search non-personal corpus(es), such as public corpus(es) and/or non-personal corpus(es) that include access restricted documents. For example, the search system 110 may additionally search public corpus(es) and provide search results that include both public content and access restricted content. Also, although document measure system 130 is illustrated in FIG. 1 as separate from the search system 110, in some implementations one or more aspects of each may be combined in a single system. For example, in some implementations one or more aspects of the document measure system 130 may be implemented by the ranking engine 112 of the search system 110.

In some implementations, document measure system 130 may include a document features engine 132, a query features engine 134, a query dependent measure engine 136, and/or a query independent measure engine 138. In some implementations, all or aspects of engines 132, 134, 136, and/or 138 may be omitted, combined, and/or implemented in a component that is separate from document measure system 130.

The document measure system 130 receives, from the search system 110, an indication of a query that has been submitted to the search system 110 and/or an indication of one or more documents that have been identified by the search system 110 as responsive to the query, such as access restricted documents from the personal corpus(es) 158.

The document features engine 132 identifies, for each of the documents, one or more document features for the document. Various document features may be identified, such as category features, structural features, and/or n-gram features described herein. For example, for an image document that is responsive to a query, document features may include n-grams or other indications that indicate particular object(s) and/or class(es) of object(s) that are present in the image document (e.g., as determined based on automated image analysis and/or human applied tags). In some implementations, all or aspects of the document features engine 132 may be implemented by the search system 110.

The query features engine 134 identifies, for the query, one or more query features for the query. Various query features may be identified, such as one or more n-grams appearing in the query, one or more entities referenced in the query, one or more entity categories referenced in the query, grammatical features, etc. In some implementations, all or aspects of the query features engine 134 may be implemented by the search system 110.

The query dependent measure engine 136 generates a query dependent measure for each of the documents. In determining a query dependent measure for a document, the query dependent measure engine 136 determines past interaction measures that are assigned, in the model 160, to the query features and document features determined by engines 132 and 134. For example, assume query features QF1 and QF2 for a query (where QF indicates a query feature) and document features DF1, DF2, and DF3 for an access restricted document responsive to the query (where DF indicates a document feature). The query dependent measure engine 136 may determine a past interaction measure for each of: QF1 and DF1, QF1 and DF2, QF1 and DF3, QF2 and DF1, QF2 and DF2, and QF2 and DF3. The query dependent measure engine 136 may then generate the query dependent measure for the access restricted document based on a combination of the six separate past interaction measures.

Each of the past interaction measures utilized by the query dependent measure engine 136 may be based on a quantity of the past interactions, by corresponding users, with other documents having one or more of the document features when the other documents were presented in response to corresponding queries having one or more of the query features. The other documents themselves may include, or be restricted to, a plurality of access restricted documents, such as non-accessible documents that are each personal to a corresponding one of the other users and that are not accessible to the user. Additional description of generating past interaction measures is provided herein.

The query independent measure engine 138 generates a query independent measure for each of the documents. In determining a query independent measure for a document, the query independent measure engine 138 determines past interaction measures that are assigned, in the model 160, to a group of query features and to the document features determined by engine 134. The group of query features include, or is restricted to, query features that are in addition to those determined by the query features engine 134. Accordingly, the group of query features is independent from the query for which the document is responsive in the sense that it includes query features that are in addition to query features of the query. As one example, assume document features DF1, DF2, and DF3 for an access restricted document (where DF indicates a document feature). The query independent measure engine 138 may determine: all of the past interaction measures between the group of query features and DF1, all of the past interaction measures between the group of query features and DF2, and all of the past interaction measures between the group of query features and DF3. For instance, assume the group of query features includes query features QF1-QF1000. For DF1 past interactions measures may be determined for QF1 and DF1, QF2 and DF1, QF3 and DF1, . . . , and QF1000 and DF1. The query independent measure engine 136 may then generate the query dependent measure based on a combination of the past interaction measures.

The document measure system 130 provides the query dependent measure and/or the query independent measure for each of the documents to the search system 110. The ranking engine 112 may utilize the query dependent measures and/or the query independent measures in ranking the documents and may use the ranking in determining a presentation order and/or other presentation characteristic for search results for the documents. In some implementations, the ranking engine 112 utilizes the query dependent measure and/or the query independent measure to determine a score for the document and uses the score to rank the document. For example, the ranking engine 112 may adjust a base score for the document (e.g., a base score that is based on other ranking signals) in view of the query dependent measure and/or the query independent measure, to create a modified score.

As one example assume a base score of $sc_b$ for a document for a query. This base score can be based on, for example, keyword matching and/or other ranking signal(s). The ranking engine 112 may determine a final score, $sc_f$ based on $f(sc_b, M_d, M_{q,d})$ where $M_d$ represents the query dependent measure for the document and where $M_{q,d}$ represents the query independent measure for the document. $f(\bullet)$ can optionally be a hand-tuned score or a machine learned ranking function. In some implementations, the ranking engine 112 keeps the base score ($sc_b$) fixed, and trains an adjustment $\delta(M_d, M_{q,d})$ over the base score $sc_b$. The scoring function $f(\bullet)$ thus becomes: $f(sc_b, M_d, M_{q,d}) = sc_b + \delta(M_d, M_{q,d})$. This adaptive formulation may be beneficial for environments where the base score is already highly optimized, and optionally disjoint with the query independent and/or query dependent measures.

In some implementations, past interaction measures system 120 may include a query-document model engine 122, a document-feature model engine 124, a query-feature model engine 126, and/or a query feature—document feature model engine 128. In some implementations, all or aspects of engines 122, 124, 126, and/or 128 may be omitted, combined, and/or implemented in a component that is separate from past interaction measures system 120.

The query-document model engine 122 generates the query-document model 150. In some implementations, all or aspects of the query-document model engine 122 may be implemented by the search system 110. The query-document model 150 may be, for example, a bipartite graph that models the interactions between queries and documents, as indicated by one or more stored records of past queries and corresponding interactions. For example, the nodes of the query-document graph may indicate queries and documents. The edges may be between query and document nodes and may each represent, for example, whether the corresponding document was observed for the corresponding query (e.g., a corresponding search result presented in response to the corresponding query) and/or whether the document was interacted with (e.g., selection of a corresponding search result) for the corresponding query. In some implementations, each of the edges may include a binary representation of whether an interaction occurred. In some implementations, the edges may be weighted based on a type of the interaction. For example a selection of a search result followed by access of the underlying document for at least a threshold time duration may be weighted more heavily than a selection that is followed by access of the underlying document that is not for the threshold time duration, which may be weighted more heavily than a "hover" over the search result without a resulting selection.

In some implementations, the query-document model 150 may be represented by a triple $(\mathcal{Q}, \mathcal{D}, \mathcal{E}^{QD})$, where $\mathcal{Q}$ is the set of query nodes representing corresponding queries, $\mathcal{D}$ is the set of document nodes representing corresponding documents, and the edge set $\mathcal{E}^{QD}$ represents the edges connecting the query nodes and document nodes. The edges in the edge set $\mathcal{E}^{QD}$ may be parameterized by tuples of the form $e(q, d) = \langle \gamma_o(q, d), \gamma_c(q, d) \rangle$, where q represents a query node connected by the edge, d represents a document node connected by the edge, and parameterization functions $\gamma_o(a, b)$ and $\gamma_c(a, b)$ indicate that entities a and b were observed or clicked in the same search session, respectively.

In this specification, the term "graph" will be used broadly to refer to any mapping of a plurality of associated information items. A graph, or a portion of a graph, need not be present in a single storage device and may include pointers or other indications of information items that may be present on other storage devices. For example, a graph may include multiple nodes mapped to one another, with each node including an identifier of an entity or other information item that may be present in another data structure and/or another storage medium.

The document-feature model engine 124 generates a document-feature model that may optionally be included in the model(s) 160. The document-feature model engine 124 may generate the document features based on documents that are included in the query-document model 150. For example, for each of the documents of the query-document model 150, the engine 124 may identify one or more document features and define a relationship between the document and its document features. The document-feature model may be, for example, a bipartite graph that models the relationship between documents and their document features. For example, a first node in the model may represent a document feature and that node may be connected, by corresponding edges, to each of a plurality of document nodes that each represent a corresponding document that include the document feature. The edges may each indicate whether a corresponding feature is present in a corresponding document, and optionally a weight of the corresponding feature for the corresponding document (e.g., for a category feature the weight may indicate how strongly the document is associated with the category). Various features may be utilized, such as category features, structural features, and/or n-gram features.

In some implementations, the document-feature model may be represented by a triple $(\mathcal{D}, A^D, \mathcal{E}^D)$, where D is the set of document nodes representing corresponding documents where $A^D$ is the set of document feature nodes representing the set of document features, and the edge set $\mathcal{E}^D$ represents the edges connecting the document nodes and the document feature nodes. The edges in the edge set $\mathcal{E}^D$ may be parameterized by $e(d, a_{ij}^d)$, where $e(d, a_{ij}^d)$ indicates whether a corresponding feature is present in a corresponding document, and optionally a weight of the corresponding feature for the corresponding document.

The query-feature model engine 126 generates a query-feature model that may optionally be included in the model(s) 160. The query-feature model engine 126 may generate the features for queries that are included in the query-document model 150. For example, for each of the queries of the query-document model 150, the engine 126 may identify one or more query features and define a relationship between the query and its query features. The query-feature model may be, for example, a bipartite graph that models the relationship between queries and their query features. For example, a first node in the model may represent a query feature and that node may be connected, by corresponding edges, to each of a plurality of query nodes that each represent a corresponding query that include the query feature. The edges may each indicate whether a corresponding feature is present in a corresponding query, and optionally a weight of the corresponding feature for the corresponding query. Various features may be utilized, such as one or more n-grams appearing in the query, one or more entities referenced in the query, one or more entity categories referenced in the query, grammatical features of the query, etc.

The query-feature model may be represented by a triple ($Q, A^Q, \mathcal{E}^Q$), where $Q$ is the set of query nodes representing corresponding queries where $A^Q$ is the set of query feature nodes representing the set of query features, and the edge set $\mathcal{E}^Q$ represents the edges connecting the query nodes and the query feature nodes. The edges in the edge set $\mathcal{E}^Q$ may be parameterized by $e(q, a_{kl}^q)$, where $e(q, a_{kl}^q)$ indicates whether a corresponding query feature is present in a corresponding query, and optionally a weight of the corresponding feature for the corresponding query.

The query feature—document feature model engine 128 generates a query feature—document feature model that may optionally be included in the model(s) 160. The query feature—document feature model may be, for example, a bipartite graph that is generated using the query-document graph, the document-feature graph, and the query-feature graph. The query feature—document feature model models the interactions between document features and query features. In other words, it models interactions between document and query features, instead of interactions directly between queries and documents. In some implementations, it is generated based on transforming the query-document model to the "document features" and "query features" space collectively modeled by the document-feature and query-feature models.

The query feature-document feature model may be represented by a triple ($A^Q, A^D, \mathcal{E}^A$), where $A^Q$ is the set of query feature nodes representing the set of query features, $A^D$ is the set of document feature nodes representing the set of document attributes, and the edge set $\mathcal{E}^A$ represent the edges connecting the query feature nodes and the document feature nodes. The edges in the edge set $\mathcal{E}^A$ each have a weight or other measure that is based on the quantity of past interactions between the query feature of the corresponding query feature node and the document feature of the corresponding document feature nodes. The edges in the edge set $\mathcal{E}^A$ may be parameterized by:

$$e(a_{kl}^q, a_{ij}^d) = \sum_{q:e(q,a_{kl}^q)=1} \sum_{d:e(d,a_{ij}^d)=1} e(q, d) = \langle \gamma_o(a_{kl}^q, a_{ij}^d), \gamma_c(a_{kl}^q, a_{ij}^d) \rangle,$$

where the edge functions e(•) are each defined as set forth above. As appreciated by viewing the parametrization of the edges set forth above, the parameterization models query-document attribute observed and co-click associations via summation over all the queries and documents that can be associated with their respective attributes.

In many implementations, only features (query or document) that are present in at least a threshold number of times (in queries or documents) and/or for at least a threshold number of users may be utilized in generating the query-feature, document-feature, and/or the query feature—document feature models. In some of those implementations, this may ensure feature nodes do not include sensitive information by ensuring features of those feature nodes occur at least a threshold number of times and/or for at least a threshold number of users. In some of those implementations, this may be achieved by removing, from the document-feature graph, any document feature nodes that do not have at least a threshold number of edges indicating presence in corresponding documents; and/or by removing, from the query-feature model, any query feature nodes that do not have at least a threshold number of edges indicating presence in corresponding queries. Additionally or alternatively, query feature nodes and/or document feature nodes may be removed from the query feature-document feature model utilizing similar techniques.

The query feature—document feature model may be utilized to determine, for a given document, a query independent measure and/or query dependent measure for the given document. For example, to determine a query dependent measure for a given query having given query feature(s), edges between the given query feature(s) and document features of the document may be determined. Each of the edges provides a measure of past interactions between a corresponding query feature and a corresponding document feature. The measures may be combined (e.g., summed and/or other statistical combination) to determine the query dependent measure. Also, for example, to determine a query independent measure for the given document, edges between a group of query features (that includes or is restricted to query features not included in the given query features) and document features of the document may be determined. The measures may be combined (e.g., summed and/or other statistical combination) to determine the query independent measure.

Additional description of various models that may be utilized in various implementations is provided with reference to FIGS. 2A-2D, and FIG. 3.

Figure 2A:
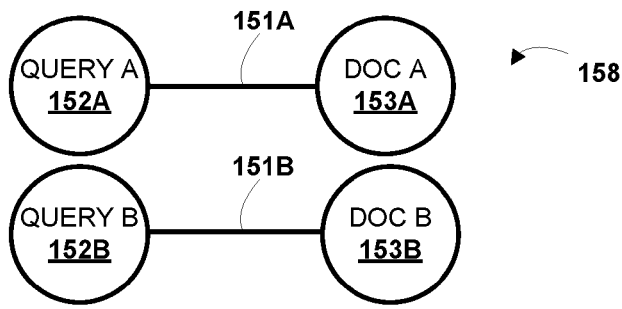
FIG. 2A illustrates a representation of a portion of a query-document model according to various implementations.

FIG. 2A illustrates a representation of a portion of the query-document model 158 according to various implementations. The portion includes a query node 152A connected by an edge 151A to a document node 153A. The portion also includes a separate query node 152B connected by an edge 151B to another document node 153B.

Query node 152A represents a particular query and document node 153A represents a particular document. For purposes of a working example, it will be assumed that query node 152A represents a query of "book order number" and document node 153A represents the email 353A of FIG. 3. The edge 151A represents that a search result for the document corresponding to document node 153A was interacted with by a user in response to the query corresponding to query node 152A.

Query node 152B represents a particular query that is distinct from the particular query represented by query node 152A and document node 153A represents a particular document that is distinct from that represented by document node 153A. For purposes of the working example, it will be assumed that query node 152B represents a query of "book order" and document node 153B represents the email 353B of FIG. 3. The edge 151B represents that a search result for the document corresponding to document node 153B was interacted with by a user in response to the query corresponding to query node 152B.

It is understood that the query-document model 158 will include a large number of additional query nodes, document nodes, and edges. For example, additional edges will be provided that connect additional query nodes and additional document nodes. Also, for example, it is possible that additional edges may be connected to one or more of the nodes 152A, 152B, 153A, and 153B. For instance, the document represented by document node 153A may have been selected in response to multiple distinct queries. Also, for instance, the query represented by query node 152A may have been issued by multiple users and used to select multiple distinct documents, such as multiple access restricted documents of those users.

Figure 2B:
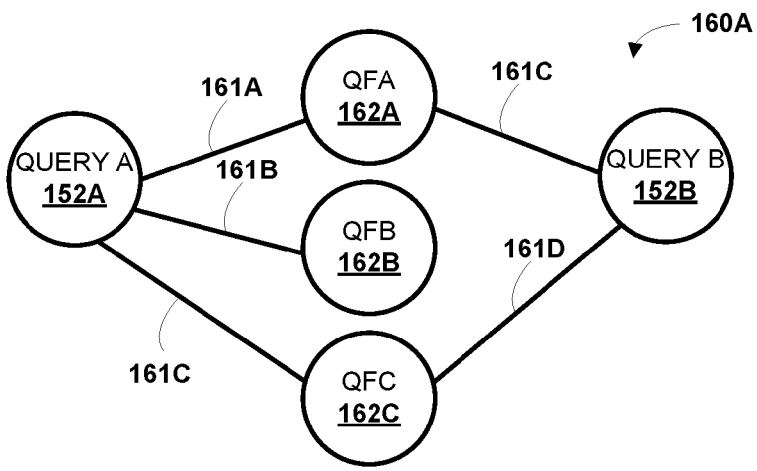
FIG. 2B illustrates a representation of a portion of a query-feature model according to various implementations.

FIG. 2B illustrates a representation of a portion of a query-feature model 160A of model(s) 160 according to various implementations. Query node 152A is connected to query feature nodes 162A-C by corresponding edges 161A-C, indicating the query represented by query node 152A has the query features represented by query feature nodes 162A-C. Query node 152B is connected to query feature nodes 162A and 162C by corresponding edges 161A and 161C, but is not connected to query feature node 162B. The lack of an edge between query node 152B and query feature node 162B indicates the query represented by query node 152B does not have the query feature represented by query feature node 162B. In some implementations an edge may still be defined, but may indicate that the feature is not present (e.g., that edge may be a "not present" edge, whereas edges 161C and 161D may be "present" edges).

Continuing with the working example, query feature node 162A may be a query feature of an n-gram "book order", query feature node 162B may be a query feature of an n-gram "book order number", and query feature node 162C may be a query feature of an n-gram "order".

It is understood that the query-feature model will include a large number of additional query nodes, query feature nodes, and edges. For example, additional query feature nodes may be connected to each of query nodes 152A and 152B. Also, for example, each of query feature nodes 162A-C may be connected to a plurality of additional query nodes. Also, for example, additional query nodes and additional query feature nodes will be provided with corresponding edges.

Figure 2C:
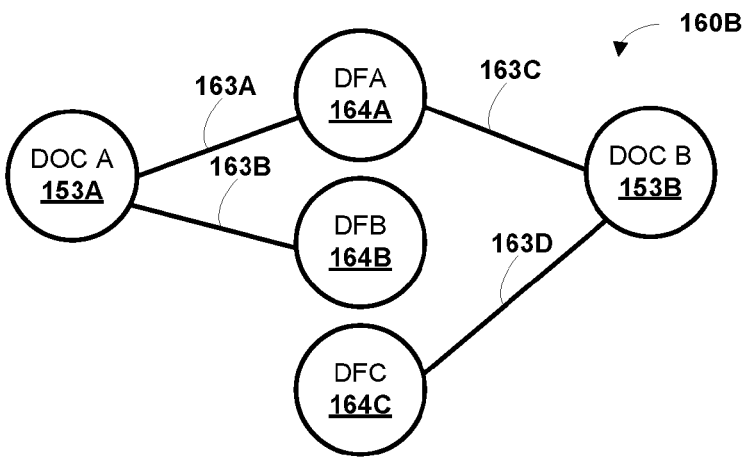
FIG. 2C illustrates a representation of a portion of a document-feature model according to various implementations.

FIG. 2C illustrates a representation of a portion of a document-feature model 160*b* of model(s) 160 according to various implementations. Document node 153A is connected to document feature nodes 164A and 164B by corresponding edges 163A and 163B, indicating the document represented by document node 153A has the document features represented by document feature nodes 164A and 164B. Document node 153B is connected to document feature nodes 164A and 164C by corresponding edges 163C and 163D, indicating the document represented by document node 153B has the document features represented by document feature nodes 164A and 164C. The lack of an edge between document node 153A and document feature node 164C indicates the document represented by document node 153A does not have the document feature represented by document feature node 164C. Likewise, the lack of an edge between document node 153B and document feature node 164B indicates the document represented by document node 153B does not have the document feature represented by document feature node 164B. In some implementations, instead of lack of edges, edges may still be defined, but may indicate that the corresponding document feature is not present.

Continuing with the working example, document feature node 164A may be a structural document feature such as one that indicates particular content in a From field and/or Sender field that is present in the emails 353A and 353B. For example, the document feature node 164A may indicate co-occurrence of the domain name "@exampleurl.com" in a From field and the template "Purchase Confirmation—[#]" in a Subject field, where [#] is a placeholder indicating an alpha and/or numeric string. As another example, the document feature node 164A (or an additional document feature nod) may instead indicate co-occurrence of particular content in both a From field and Subject field (e.g., co-occurence of "store@exampleurl.com" in a From field and "Purchase Confirmation" in a Subject field), or that particular content is included in only one of the From field and the Subject field. Document feature node 164A may indicate an n-gram from the body of the email 353A such as the made-up book title "Bald Potter". Document feature node 164C may indicate an n-gram from the body of the email 353A such as the made-up book title "Fear and Dislike in Los Angeles".

It is understood that the document-feature model will include a large number of additional document nodes, document feature nodes, and edges. For example, additional document feature nodes may be connected to each of document nodes 153A and 153B. Also, for example, each of document feature nodes 164A-C may be connected to a plurality of additional document nodes. Also, for example, additional document nodes and document feature nodes will be provided with corresponding edges.

Figure 2D:
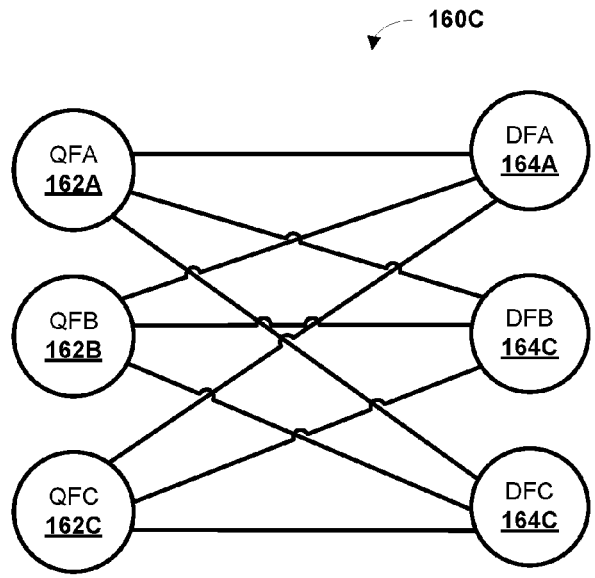
FIG. 2D illustrates a representation of a portion of a query feature—document feature model according to various implementations.
Figure 3:
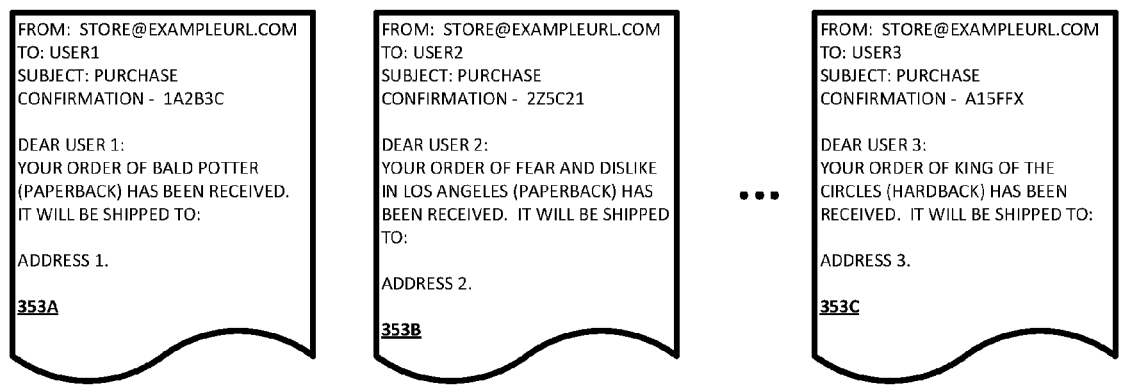
FIG. 3 illustrates an example of multiple access restricted documents of multiple users.

FIG. 2D illustrates a representation of a portion of a query feature-document feature model 160C of model(s) 160 according to various implementations. The query feature nodes 162A-C are each connected to each of the document feature nodes 164A-C by corresponding edges. The edges of FIG. 2D are not labeled for the sake of simplicity. Each of the edges of FIG. 2D defines a corresponding past interaction measure between a corresponding query feature node and document feature node and may be generated based on the models illustrated in part in FIGS. 2A-2C.

It is noted that, in generating the past interaction measures defined by the edges of FIG. 2D, the two query to document interactions represented in FIG. 2A will have a positive influence on the past interaction measures of all of the edges except the edge between query feature node 162B and document feature node 164C. That is because, as indicated by the models of FIGS. 2A-2C, the interactions represented in FIG. 2A do not indicate an interaction between query feature node 162B and document feature node 164C. In other words, since document feature node 164C is associated with document node 153B, but not with document node 153A—and query feature node 162B is associated with query node 152A, but not query node 152B—the interactions of FIG. 2A do not map to interactions between the query feature node 162B and the document feature node 164C. As with the other models, it is understood that the query feature-document feature model will include a large number of additional query feature nodes, document feature nodes, and edges.

Figure 4:
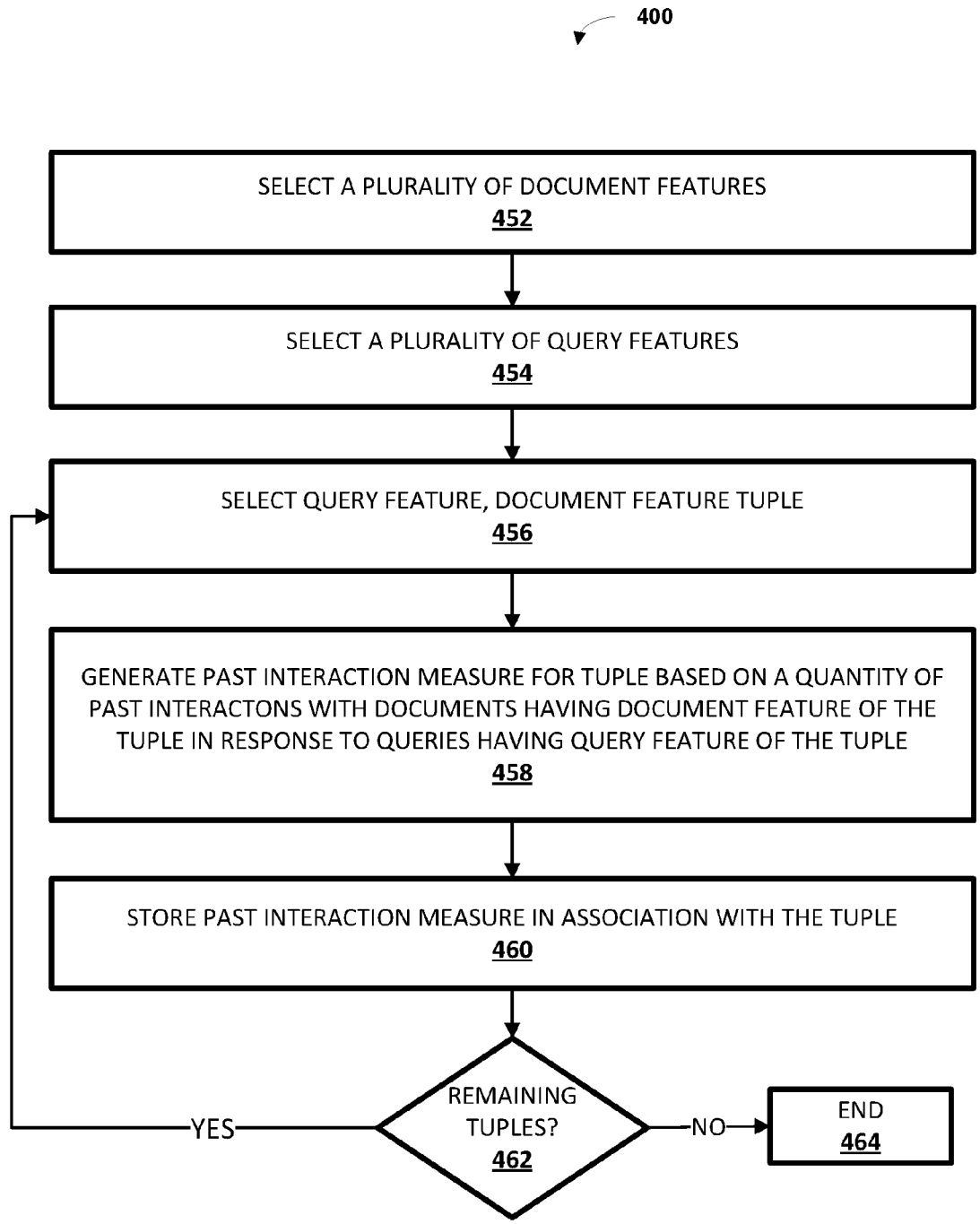
FIG. 4 is a flow chart illustrating an example method of generating past interaction measures for each of a plurality of query feature, document feature tuples.

FIG. 4 is a flowchart illustrating an example method 400 of generating past interaction measures for each of a plurality of query feature, document feature tuples. For convenience, the operations of the flow chart are described with reference to a system that performs the operations. This system may include various components of various computer systems, such as one or more components of past interaction measures system 120. Moreover, while operations of method 400 are shown in a particular order, this is not meant to be limiting. One or more operations may be reordered, omitted or added.

At block 452, the system selects a plurality of document features. For example, the system may select the document features based on the document features occurring in access restricted documents of at least a threshold quantity of users and/or occurring in at least a threshold quantity of documents. In some implementations, the system selects the document features based on those features being features for documents included in a query-document model as described herein. In some implementations, in selecting the document features the system creates a document-features model as described herein.

At block 454, the system selects a plurality of query features. For example, the system may select the query features based on the query features occurring in queries, for access restricted documents, of at least a threshold quantity of users and/or occurring in at least a threshold quantity of such queries. In some implementations, the system selects the query features based on those features being features for queries included in a query-document model as described herein. In some implementations, in selecting the query features the system creates a query-features model as described herein.

At block 456, the system selects a query feature, document feature tuple. For example, the query feature, document feature tuple may be a single query feature and a single document feature. In some implementations, a single query feature and/or a single document feature may itself be a combination of features. For example, the single document feature may be the co-occurrence of: certain first content in a first particular field of a document; and certain second content in a second particular field of the document.

At block 458, the system generates a past interaction measure for the tuple based on a quantity of past interactions with documents having document feature(s) of the tuple in response to queries having query feature(s) of the tuple. In some implementations, the system may generate the past interaction measure based on transforming a query-document model to a "document features" and "query features" space collectively modeled by document-feature and query-feature models as described herein.

At block 460, the system stores the past interaction measure in association with the tuple. For example, the system may store the past interaction measure as a value for an edge that connects a query feature node that represents the query feature(s) of the tuple and a document feature node that represents the document feature(s) of the tuple. In some implementations, the past interaction measure may be stored in a query feature—document feature model as described herein.

At block 462, the system determines whether there are remaining tuples to process. If so, the system proceeds back to block 456 to select another query feature, document feature tuple, and performs another iteration of blocks 458, 460, and 462. The system may perform a large number of iterations of blocks 456, 458, 460, and 462 to generate a large number of past interaction measures for a large number of tuples. Such iterations may be performed sequentially and/or in parallel.

If at block 460 the system determines there are not remaining tuples to process, the process ends at block 464. The past interaction measures generated based on the method 400 may be utilized, for example, in method 500 described below and/or by the document measure system 130 as described herein.

Figure 5:
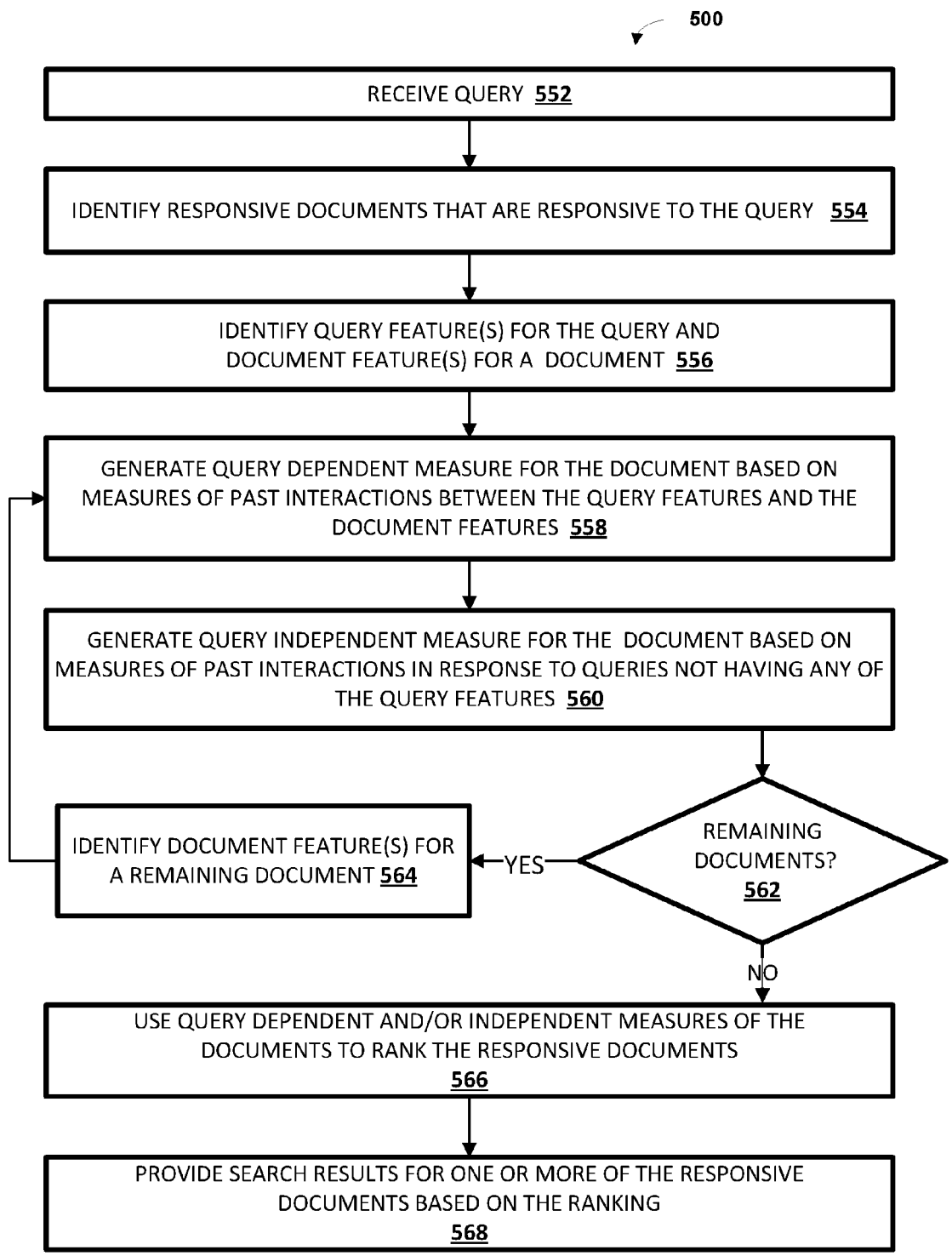
FIG. 5 is a flow chart illustrating an example method of using query dependent and/or independent measures of documents that are responsive to a query to rank the documents, and providing corresponding search results based on the ranking.

FIG. 5 is a flow chart illustrating an example method 500 of using query dependent and/or independent measures of documents that are responsive to a query to rank the documents, and providing corresponding search results based on the ranking. For convenience, the operations of the flow chart are described with reference to a system that performs the operations. This system may include various components of various computer systems, such as one or more components of document measure system 130. Moreover, while operations of method 500 are shown in a particular order, this is not meant to be limiting. One or more operations may be reordered, omitted or added.

At block 552, the system receives a query.

At block 554, the system identifies responsive documents that are responsive to the query. The responsive documents may optionally include, or be restricted to, access restricted documents.

At block 556, the system identifies one or more query features for the query of block 552 and identifies one or more document features for a document of the responsive documents of block 554.

At block 558, the system generates a query dependent measure for the document based on measures of past interactions between the query features and the document features.

At block 560, the system generates a query independent measure for the document based on measures of past interactions in response to queries not having any of the query features of the query received at block 552. In some implementations, the system may perform only one of the blocks of 558 and 560.

At block 562, the system determines whether there are remaining documents to process. If so, the system proceeds to block 564 and identifies document features for one of the remaining documents. The system then performs another iteration of blocks 558 and 560 using those document features. The system may perform multiple iterations of blocks 564, 558, and 560, each time for a different responsive document. The system may process all of the responsive documents, or a subset of the responsive documents (e.g., only the top X documents according to scores for those documents generated based on other ranking signal(s)). Multiple iterations may be performed sequentially and/or in parallel.

If, at block 562, the system determines there are not remaining access restricted documents to process, the system proceeds to block 566.

At block 566, the system uses the query dependent measures generated in multiple iterations of block 558 and/or the query independent measures generated in multiple iterations of block 560 to rank the responsive documents identified at block 554. For example, the system may adjust a base score for each of the responsive documents (e.g., a base score that is based on other ranking signal(s)) in view of the query dependent measure and/or the query independent measure, to create a modified score.

At block 568, the system provides search results for one or more of the responsive documents based on the ranking of block 566. Providing the search results based on the ranking of block 566 may include providing the search results with a presentation characteristic that is based on the ranking, such as a presentation order.

FIG. 6 illustrates an example of the client device 106 and a display screen 140 of the computing device 106. The display screen 140 includes system interface elements 181, 182, 183 that may be interacted with by the user to cause the client device 106 to perform one or more actions. The display screen 140 also includes a search interface element 184, where the user has entered a query "book order number" using, for example, a virtual keyboard or user interface input provided via a microphone. Search results 185A, 185B, and 185C are provided in response to the query.

In FIG. 6, search result 185A is presented first based on techniques described herein related to generating and utilizing a query dependent measure for the document corresponding to search result 185A. The search result 185A corresponds to email 353C of FIG. 3. In some implementations, the query dependent measure for the search result 185A may be determined based at least in part on a past interaction measure that is between a query feature for the query "book order number" and a document feature that is based on content in one, or both, of the Subject field and the From field of the email 353C. In some implementations, the past interaction measures based on which the query dependent measure for the search result 185A is determined may be past interaction measures determined independent of the email 353C. In some of those implementations, the past interaction measures may be determined based on distinct emails and/or other documents, such as emails 353A and 353B (FIG. 3) that are access restricted documents personal to other users and that are inaccessible to the user that entered the query in FIG. 6.

It is noted that in the example of FIG. 6, the search result 185A would not have been presented first without utilizing the query dependent measure. For example, using ranking signals that only take into account keyword matching may have caused search result 185A and search result 185C to be presented more prominently than search result 185A, since those search results include terms of the query in the Subject field of their corresponding emails. For instance, search result 185B is for an email having both "book" and "order" in its subject and search result 185C is for another email having "order" in its subject. In contrast, document 353C (the corresponding document for search result 185A) does not have any of the terms of the query in its Subject field. Rather, it only includes one of the terms ("order") in a body of the email (see FIG. 3). Accordingly, technical features described herein may be utilized to present the search result 185A more prominently than it would be without the technical features and/or to present it initially, whereas it wouldn't have been presented initially without the technical features. This may lead to the relevant search result 185A being more likely to be noticed and/or selected by the user in response to the query, which may give rise to various technical advantages. For example, it may reduce various computational resources that would otherwise be consumed had the search result not been presented more prominently, such as resources consumed as a result of: the user navigating through multiple search results to locate the search result 185A, the user issuing a new search as a result of the search result 185A not being noticed and/or presented initially, etc.

Although FIG. 6 and other examples are described with respect to email documents, many implementations described herein are additionally or alternatively applicable to other documents such as, but not limited to, other documents explicitly described herein (e.g., media documents (e.g., image documents, audio documents, video documents), calendar entry documents, contact entry documents, other electronic communications (e.g., social networking posts, chat messages)).

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Figure 7:
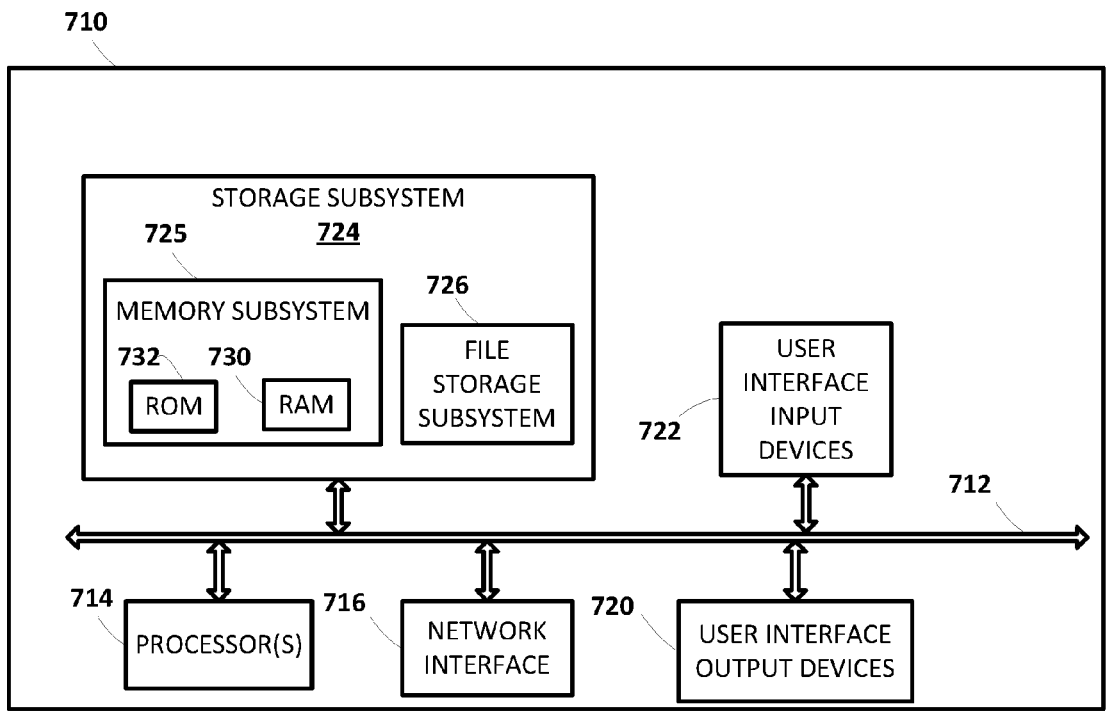
FIG. 7 illustrates an example architecture of a computing device.

FIG. 7 is a block diagram of an example computing device 710 that may optionally be utilized to perform one or more aspects of techniques described herein. In some implementations, one or more of the components of FIG. 1 may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods of FIGS. 4 and/or 5.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
    generating a graph including a plurality of nodes, wherein the plurality of nodes include a plurality of query feature nodes and a plurality of document feature nodes, and wherein at least one of the query feature nodes is connected to at least one of the document feature nodes;
    receiving a query, the query being entered by a user via a user interface input device of a computing device of the user;
    identifying responsive documents that are responsive to the query, wherein the responsive documents include an email sent to an email address of the user;
    identifying one or more document features for the email, each of the one or more document features represented in the graph by a corresponding one of the document feature nodes, and the document features comprising at least one email feature that is based on at least one of:
        From content, based on its presence in a From field of the email, and
        Subject content, based on its presence in a Subject field of the email;
    identifying one or more query features for the query, each of the one or more query features represented in the graph by a corresponding one of the query feature nodes;
    generating a query dependent measure for the email based on measures of past interactions between the query features and the document features represented in the graph,
        wherein each of a plurality of the measures is based on a quantity of the past interactions, by corresponding users, with other documents having one or more of the document features when the other documents were presented in response to corresponding queries having one or more of the query features, and
        wherein the other documents are restricted to a plurality of non-accessible documents that are not accessible to the user;
    using the query dependent measure for the email to determine a presentation characteristic for presenting an email search result that corresponds to the email; and
    providing, in response to the query, the email search result for presentation with the presentation characteristic, the presentation being via a user interface output device of the computing device.

2. The method of claim 1, wherein the at least one email feature is based on both the From content in the From field and the Subject content in the Subject field.

3. The method of claim 2, wherein the at least one email feature is co-occurrence of the From content in the From field and the Subject content in the Subject field.

4. The method of claim 3, wherein the From content comprises a domain name of a sender email address of the email.

5. The method of claim 4, wherein the Subject content comprises a template that includes one or more terms and one or more placeholders.

6. The method of claim 1, wherein the at least one email feature is based on the Subject content in the Subject field and wherein the Subject content comprises a template that includes one or more terms and one or more placeholders.

7. The method of claim 1, further comprising:
    generating a query independent measure for the email based on additional measures of additional past interactions with the document features in response to additional queries not having any of the query features; and
    further using the query independent measure for the email to determine the presentation characteristic for presenting the email search result that corresponds to the email.

8. The method of claim 1, wherein using the query dependent measure for the email to determine the presentation characteristic comprises:
    determining a score for the email based on the query dependent measure;
    determining additional scores for other of the responsive documents;
    ranking the email relative to the other of the responsive documents based on the score and the additional scores; and
    determining the presentation characteristic based on the ranking.

9. The method of claim 1, wherein the document features further comprise a category of the email, and further comprising:
    using a machine learning model to determine the category of the email.

10. The method of claim 1, wherein the past interactions with other documents having one or more of the document features comprise selections of the other documents.

11. A method implemented by one or more processors, comprising:
    generating a graph including a plurality of nodes, wherein the plurality of nodes include a plurality of query feature nodes and a plurality of document feature nodes, and wherein at least one of the query feature nodes is connected to at least one of the document feature nodes;
    receiving a query directed to a personal corpus of a user, the query being entered by the user via a user interface input device of a computing device of the user, the personal corpus of the user including access restricted documents of the user, and the access restricted documents being user accessible to only the user and any restricted group of other users designated by the user;
    identifying responsive documents that are responsive to the query, wherein the responsive documents include the access restricted documents of the user;
    identifying one or more query features for the query, each of the one or more query features represented in the graph by a corresponding one of the query feature nodes;
    for each of a plurality of the access restricted documents:
        identifying one or more document features for the access restricted document, each of the one or more document features represented in the graph by a corresponding one of the document feature nodes; and
        generating a query dependent measure for the access restricted document based on measures of past interactions between the query features and the document features represented in the graph,
            wherein each of the measures is based on a quantity of the past interactions, by corresponding users, with other documents having one or more of the document features when the other documents were presented in response to corresponding queries having one or more of the query features, and
            wherein the other documents are restricted to a plurality of non-accessible documents that are not accessible to the user;
    using the query dependent measures for the access restricted documents to determine a presentation order for the responsive documents; and
    providing, in response to the query, one or more of the responsive documents for presentation based on the presentation order, the presentation being via a user interface output device of the computing device.

12. The method of claim 11, wherein the document features for the access restricted document comprise a template that is included in a particular field of the access restricted document.

13. The method of claim 11, further comprising:
    for each of the plurality of the access restricted documents: generating a query independent measure for the access restricted document based on additional measures of additional past interactions with the document features in response to additional queries not having any of the query features; and
    further using the query independent measures for the access restricted documents to determine the presentation order for the responsive documents.

14. A method implemented by one or more processors, comprising:
    generating a graph including a plurality of nodes, wherein the plurality of nodes include a plurality of query feature nodes and a plurality of document feature nodes, and wherein at least one of the query feature nodes is connected to at least one of the document feature nodes;
    receiving a query, the query being entered by a user via a user interface input device of a computing device of the user;
    identifying responsive documents that are responsive to the query;
    identifying one or more query features for the query, each of the one or more query features represented in the graph by a corresponding one of the query feature nodes;
    for each of a plurality of the responsive documents:
        identifying one or more document features for the document, each of the one or more document features represented in the graph by a corresponding one of the document feature nodes;
        generating a query dependent measure for the document based on measures of past interactions between the query features and the document features represented in the graph,
            wherein each of the measures is based on a quantity of the past interactions, by corresponding users, with other documents having one or more of the document features when the other documents were presented in response to corresponding queries having one or more of the query features, and
            wherein the other documents include a plurality of documents that are in addition to the document,
            wherein the other documents are restricted to a plurality of non-accessible documents that are not accessible to the user, and
            wherein each of the other documents are different from the document;
    using the query dependent measures for the documents to determine a presentation order for the responsive documents; and
    providing, in response to the query, one or more of the responsive documents for presentation based on the presentation order, the presentation being via a user interface output device of the computing device.

15. The method of claim 14, wherein the document features for the document comprise a template that is included in a particular field of the document.

16. The method of claim 14, further comprising:
    for each of the plurality of the documents: generating a query independent measure for the document based on additional measures of additional past interactions with the document features in response to additional queries not having any of the query features; and
    further using the query independent measures for the documents to determine the presentation order for the responsive documents.

17. The method of claim 14, wherein generating the graph including the plurality of nodes comprises:
    generating, for the corresponding queries having one or more of the query features, a query feature graph including the query feature nodes;

generating, for the other documents having one or more of the document features, a document feature graph including the document feature nodes; and connecting the at least one of the query feature nodes to the at least one of the document feature nodes based on a given past interaction by one of the corresponding users with one of the other documents to generate the graph.

* * * * *